Aug. 7, 1945.    G. W. COOK    2,381,113
BLIND RIVET
Filed Feb. 1, 1943    2 Sheets-Sheet 1

Inventor
George W. Cook
By *[signature]*
Attys.

Aug. 7, 1945.    G. W. COOK    2,381,113
BLIND RIVET
Filed Feb. 1, 1943    2 Sheets-Sheet 2
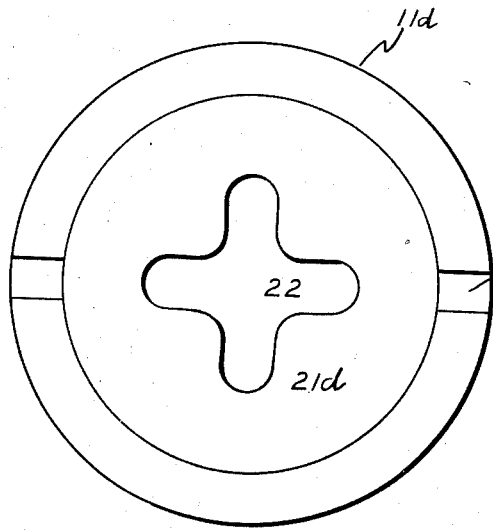
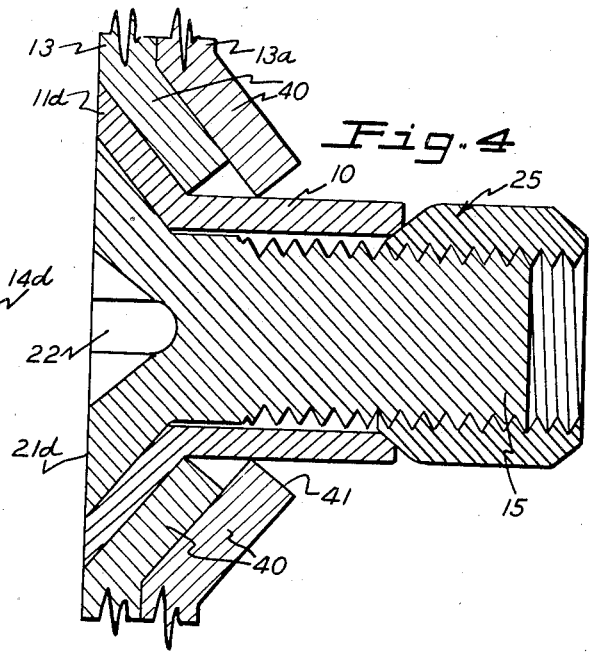
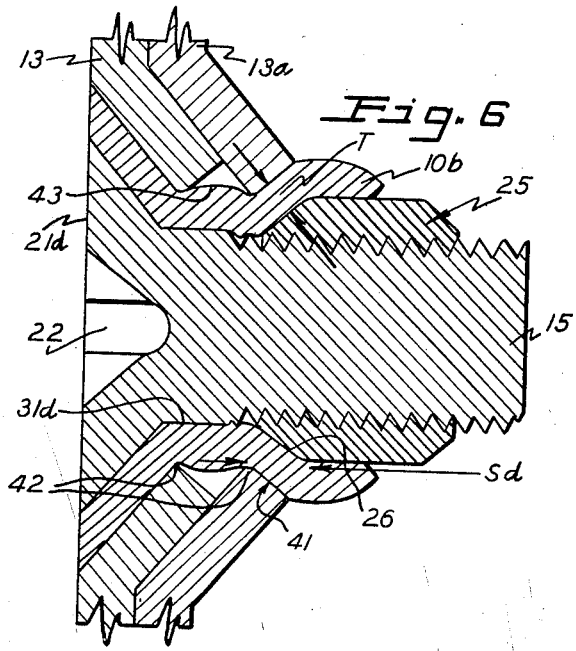
Inventor
George W. Cook
By Baldwin & Pennlebury
Attys.

Patented Aug. 7, 1945

2,381,113

UNITED STATES PATENT OFFICE 2,381,113

BLIND RIVET

George W. Cook, Los Angeles, Calif.

Application February 1, 1943, Serial No. 474,255

1 Claim. (Cl. 85—40)

My invention has primary reference to blind rivets—rivets which are peculiarly adaptable, although not limited, to use where both ends of a rivet cannot be conveniently reached for setting operations. The situation in which such securing devices are necessary or desirable are well known and need no explanation.

My general purpose is to produce a rivet of the blind type, which, although settable by operation at one end only, has substantially all of the desirable qualities possessed by ordinary solid rivets and has none of the shortcomings of other known blind rivets. Several kinds of blind rivets or equivalent fasteners have been suggested or produced and some are in use. None of these possess all of the desirable qualities which a rivet should have, and which the rivet of my invention has.

Generally speaking, a blind type rivet should be simple of structure and manufacture and facile of application. It should be easily set up tightly, both to fill its hole and to draw the riveted plates or other parts together. And when set it should have a permanence at least comparable with that of an ordinary rivet without any liability to loosen. And its strength, both in tension and shear, should be at least as great if not greater than that of an ordinary solid rivet. My rivet has all these qualities, and is generally useful wherever rivets are indicated as a securing means whether the situation be blind or not.

The features and characteristics of my invention will be best understood from the following detailed description of typical and illustrative rivet structures, reference for the purpose being had to the accompanying drawings in which:

Fig. 4 is a central longitudinal section showing another typical form of rivet in its pre-assembled condition ready for application to sheets or plates which have been counter-sunk by "dimpling";

Fig. 5 is an end view of the same;

Fig. 6 is a view similar to Fig. 4 showing the rivet fully applied, and

Figure 2:
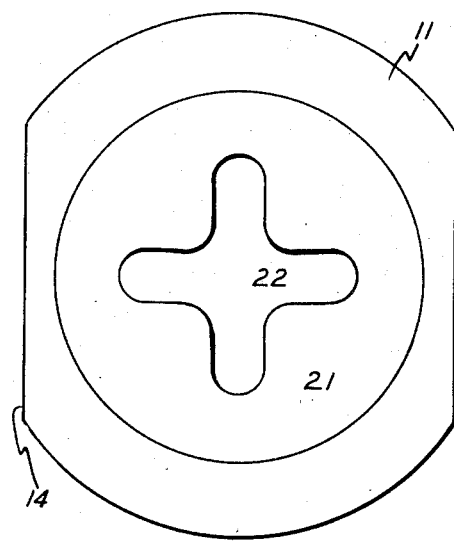
Fig. 2 is an end elevation of the same.

I may remark that the several views in the drawings are substantially accurately to scale, enlarged, of a $\frac{1}{16}$ inch rivet, and that the dimensions and strength data given hereinafter apply to a rivet of that size. This of course does not imply that my rivets are limited in any manner as to size either in diameter or in length; nor does it imply that the particular proportional dimensions which have been chosen for a $\frac{1}{16}$" rivet, and here given as illustrative, will apply to all sizes of rivets.

Figure 1:
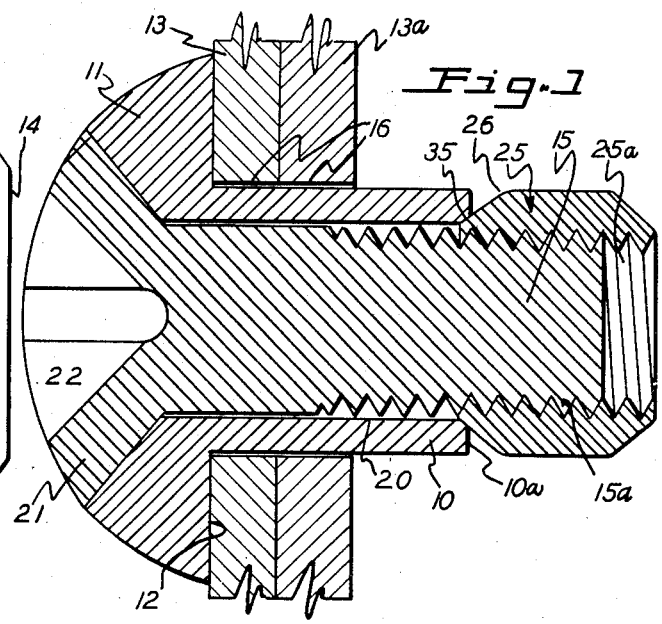
Fig. 1 is a longitudinal central section showing an illustrative form of rivet in its pre-assembled condition ready for application to a pair of flat sheets or plates.
Figure 3:
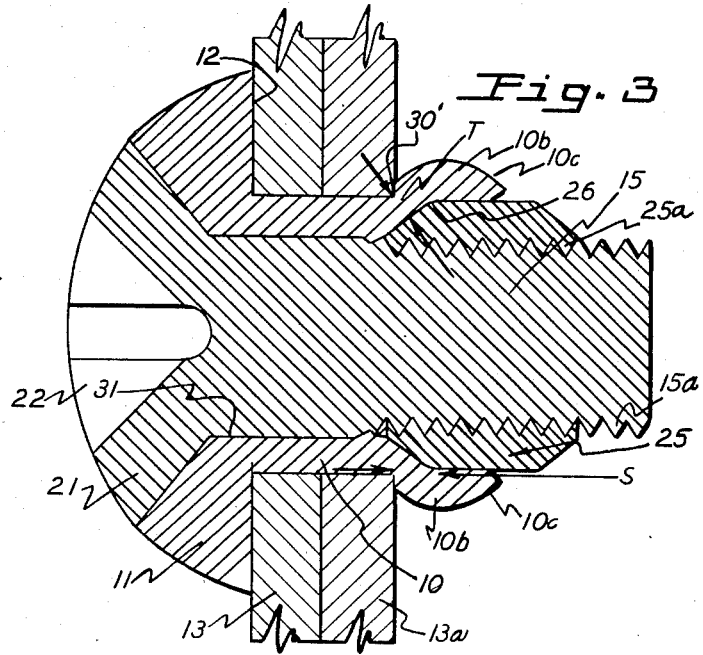
Fig. 3 is a view similar to Fig. 1 but showing the rivet finally applied.

Figs. 1, 2, and 3 show the illustrative rivet applied to a pair of flat sheets or plates. For this application of the rivet the outer head forming sleeve 10 has at one end a pre-formed head 11 which presents a flat under shoulder 12 adapted to rest flatly against one face of sheet 13. The external configuration of head 11 may be anything desired; I here show the head as being of the typical round head shape. Whatever the shape of the head may be, it is provided with some keying means engageable by a suitable tool so that the head and sleeve 10 may be held stationary while the central screw 15 is rotated to set up the rivet. That keying means may be of any suitable type; it is here shown as a pair of flats 14 at opposite sides of the head.

The length of sleeve 10, measured from shoulder face 12 to the inner end 10a, depends upon the total thickness of the sheets or plates intended to be secured together. The sleeve should have sufficient length to project beyond the inner face of the innermost sheet 13a by a length which is sufficient to form such a final expanded head as is shown at 10b in Fig. 3. In the particular size and proportions here illustrated, the desirable head forming projection of sleeve 10 beyond innermost sheet 13a is substantially as shown in Fig. 1, about equal to at least one-half the sleeve external diameter, or about equal to at least four times the sleeve thickness. It is to be particularly noted that the sleeve wall is solid throughout its length; that is, for instance, it is not slotted as are many expansive fasteners.

The external diameter of sleeve 10 is preferably slightly smaller than the diameter of sheet holes 16 which the rivet is intended to fill. As will be explained later, one of the desirable actions of my rivet is to expand in diameter upon being set to the condition shown in Fig. 3. Consequently, in order to obtain a tight filling of the holes, it is not necessary that the rivet be a forcing or driving fit in them. Thus, my rivet of the illustrative $\frac{1}{16}$" size may be placed and set solidly in the standard oversize hole which is used for ordinary solid rivets of that size; as an illustration, in a number 11 drill hole which is about .004" oversize for the 1/8" rivet.

The internal screw 15 for the illustrative rivet here being described, is preferably of about the size of a standard No. 6 machine screw, and for practical and economical purposes a standard commercial screw of that size is here preferred, having threads 15a of the pitch commonly known as the fine pitch for that size screw—a pitch of 40 to the inch. This is to make the screw securely self-locking. The internal bore of sleeve 10 is initially such that screw 15 fits that bore freely or rather loosely, to facilitate easy assembly. It is another one of the desirable features of my rivet that, when set, the internal bore of the head forming sleeve is contracted tightly around the screw; and because of that the screw may initially fit the bore freely, as shown in Fig. 1. For instance, in the particular size here illustrated, the screw 15 is 0.136" diameter and internal sleeve bore 20 may typically be 0.138" diameter. The typical sleeve thickness for the 1/8" rivet here shown is 0.0248" or substantially 1/40 of an inch.

As here typically shown, the screw diameter is approximately .725 of the external sleeve diameter. That proportion may be varied, with the typical materials here described, between approximately .666 and .750.

Screw 15 has a head 21 at its outer end having shouldered bearing on sleeve head 11. That screw head and shouldered bearing may be of any suitable shape and type, but is here shown as conical or counter-sunk in form and with its exterior face substantially completing the round or spheric outer face of sleeve head 11. For purposes of screw rotation, while sleeve head 11 is held stationary, screw head 21 is provided with any suitable keying means, for instance with the screw driver engaging formation shown at 22.

Screw 15 is of such length that its inner end projects beyond the inner end of sleeve 10 by a distance either equal to or not much less than the length of the expanding nut 25. Nut 25 preferably has an external cylindric diameter equal to the external diameter of sleeve 10; that is, nut 25 is preferably as large as can be freely passed through holes 16. The nut can be somewhat smaller than sleeve 10, but is preferably of the full sleeve size for reasons which will appear. The length of nut 25 preferably at least equals two-thirds its external diameter and is here shown as being somewhat proportionately longer than that. The ample length of nut 25 is of some importance, as will appear. It is important that screw threads 25a of the nut do not fit threads 15a of the screw too closely, so that the nut will not tend to turn when the screw is rotated. For practical purposes I utilize what is known as a No. 2 fit. That fairly loose fit is satisfactory. The tighter No. 3 fit may be used but is not necessary. Using such a free fit, which is desirable, the nut should have a length equal to not less than substantially two-thirds of its external diameter, or not less than substantially the external screw diameter, not only in order to insure against thread stripping but also to insure, what is of great importance, that the nut will not have any appreciable freedom to cock over on the screw threads to a position out of proper alinement. It is very important that the front expanding face of the nut be maintained closely in a plane normal to the axis of the screw and of the whole rivet, in order that the setting up of the rivet and formation of the head shall be fully effective.

The forward face of nut 25 is beveled to a conical surface 26 of an included angle of between substantially 70° and 90°, being here shown at an included angle of 80°. A conical angle within substantially the limits stated, and with the materials which are chosen for the several parts of the rivet, has the double function of both expanding sleeve 10 as the nut is drawn forwardly and also of longitudinally compressing the sleeve to expand the sleeve wall in thickness. Within the limits stated, I also prefer the included angle of approximately 80° because that included angle cooperates best with the average included angle of dimpled countersinks such as shown in Fig. 4.

To prevent nut 25 from rotating when screw 15 is rotated to draw the nut into the sleeve, the conical face 26 is preferably finely knurled or otherwise serrated over substantially its entire face to produce sharp teeth which are preferably of full depth at the forward face 27 of the nut and which preferably vanish at or near the intersection of conical face 26 with cylindric face 28. The vanishing line for the teeth, or for the depressions between the teeth, is preferably such that no teeth or depressions appear in any part of the cylindric face 28. This configuration of the knurled teeth may be produced by using a knurling wheel placed at such an angle that the full depth of knurl is produced at the forward face 27, but the knurls disappear before the base of the cone is reached. This configuration of the knurl depressions is indicated by the bottom line shown at 29 in Fig. 7. However, I also preferably round off the external contour of the nut, at 30, at the intersection of the conical and cylindric faces, for reasons which will appear; and a knurling of uniform depth over the conical face may be used, with the knurling vanishing in the curve at 30 before reaching the cylindric surface 28. The pitch of the knurled teeth is preferably relatively rather fine, say about 80 to the inch for the illustrative rivet size. As will appear, the material of sleeve 10 is comparatively soft and ductile, and I find that comparatively fine pitched, sharp toothed, knurling cooperates best with such sleeve material to prevent nut rotation without damaging the sleeve. If the knurled teeth are too coarse there is a tendency to deform or split the sleeve as the nut is drawn in, and if the teeth on the nut are too few in number there is a tendency either to split or deform the sleeve or for the nut to turn and for the teeth to merely bore out the end of the sleeve. The knurled teeth may be hardened if desired. The process of anodizing the nut, if of aluminum alloy, or hard plating if of other metals, hardens the teeth on the knurled surface of the nut.

Figure 7:
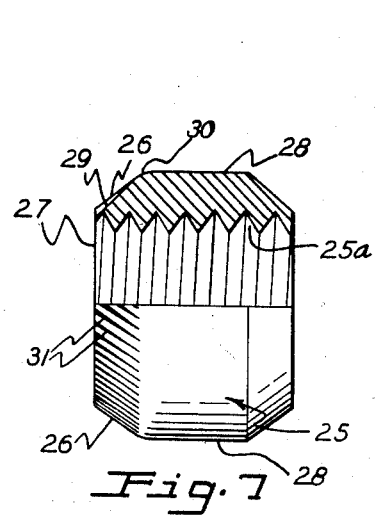
Fig. 7 is a semisection-and-elevation of the typical nut which forms a part of the rivet assembly.

Preferably also, the knurled teeth are produced along spiral lines of long pitch, as indicated at 31 in Fig. 7. The pitch angle may be from 0° (no spiral) to approximately 27°. Larger angles cause the teeth to over-ride and slip circumferentially. Assuming that screw 15 has a right-handed thread, then the knurled teeth lying along right-handed spiral lines tend to cause the teeth to cut into sleeve 10 along the length of the teeth, rather than to slip and damage the sleeve.

Sleeve 10 is of a definitely soft material of relatively high ductility. It must be of a material softer than that of the nut so that the nut teeth will bite into it. It must be definitely ductile so that it may be forced to the expanded head shape of Fig. 3 without developing splits or cracks. Typical materials are soft ferrous iron, or soft steel, copper, aluminum, or aluminum alloy which has sufficient ductility. Since the strengths of the sleeve, in tension and shear, enter into the ultimate strengths of the whole rivet, it is preferable for some purposes to use a heat treated aluminum alloy of such a type as the rivet stock known as 17S, an alloy of Al, Mg, Cu. Immediately after heat treatment such an alloy has the desired softness and ductility and the rivet is set while the material has those properties. In that condition the alloy has a Brinell hardness of 45 and an elongation of 25%–30%. The forming operations on the head 10b then increase its hardness; and, as well known, its hardness and strength are increased to about Brinell 100 and 30,000 pounds shear and 62,000 tensile by aging after the rivet is set. On the other hand an alloy such as A17S may be used which does not change its properties as much as the material 17S. Immediately after heat treatment it has about the same hardness, elongation and strengths as 17S, but its ultimates are not so high; hardness 70, shear 26,000, tensile 43,000. The failure strengths given herein are for rivets with a sleeve of A17S. Other typical and suitable materials are as follows. Soft open hearth carbon steel; tensile strength 56,000; shear 42,000; elongation 30%; hardness 50. Soft copper; tensile strength 37,000; shear 30,000; elongation 30%; hardness 30. Hardness of the sleeve material should in any case preferably not be above approximately 70. Preferred ductility may range to not less than approximately 20% elongation. If the ductility is relatively high the hardness may be in the higher ranges.

The screw is made of a material which is as hard and as strong, in both shear and tension, as is practicable, as both the shear and tensile strengths of the set rivet depend largely on the screw. As will be seen, the set rivet does not depend only on the strengths of the sleeve. In practice, at least for the design proportions shown here, I find that the usual commercial steel of about 65,000 pounds tensile and 52,000 pounds shearing strength used in commercial machine screws, is satisfactory. Its Brinell hardness is about 125. Harder and stronger materials however may be used to advantage in some instances, as I will explain.

It has been stated that the nut is harder than the sleeve. Preferably it is also softer than the screw, especially when a screw material of highest strength and hardness is used. For the screw material given as an illustration, the nut may be of the same material, but is preferably softer. It should not be harder than is needed for thread strength and for biting into the sleeve. For instance a typical nut material, for the given screw and sleeve, may be of a steel softer than that of the screw, or of an aluminum alloy considerably harder than that of the sleeve; e. g. an aluminum alloy such as known in the trade as 11ST3 having a tensile strength of about 49,000 pounds and a hardness of 95. The test figures herein given are for rivets with nuts of this materials and with screws of the stock steel mentioned above.

It is important that the nut material be such that it will effectively contract at its forward end, under the compression of the softer weaker sleeve, to grip the screw tightly as the rivet is fully set. This compressing action may be accomplished by splitting the forward conical end of the nut, but that is not preferable; it is preferred to make the nut of a material capable of being radially compressed by the sleeve—a material which, although harder than the sleeve is still preferably softer than the material of the screw, particularly if a very hard and strong screw is used. The materials stated above are illustrative.

The rivet is initially preassembled as shown in Fig. 1, with nut 25 lightly set up against the inner end of sleeve 10. The sleeve is preferably internally bevelled at its end at 35 to receive the conical nut. The assembly having been set in the registered plate holes as illustrated, a suitable tool is applied to the head. In setting up the rivet it is of course only necessary that the sleeve and screw be rotated relatively to each other; but it is preferred to hold the sleeve stationary, so that it is not rotated with relation to the sheets or plates, and to rotate the screw in the sleeve. And it is preferred to hold the sleeve stationary by use of the suitable tool rather than to try to hold it stationary by use of some interlock with the sheet or plate. Notching the plate in any manner is objectionable, and any interlocking arrangement which engages a thin sheet is likely to tear it when the screw is forcibly rotated to set the rivet.

As the screw is rotated, nut 25 is drawn in toward and to the relative position shown in Fig. 3. As the nut is drawn in the knurled conical face of the nut bites into the sleeve to hold the nut against rotation, and the conical end of the nut, pressing longitudinally and outwardly against the sleeve, expands the end of the sleeve and at the same time exerts a considerable longitudinal compressive force on it. As the nut is drawn in, both the expansive and compressive force components continue. The sleeve is compressed longitudinally, with a resultant expansion of its external diameter and contraction of its internal diameter. At the same time, the inner end portion of the sleeve is expanded around the conical forward face of the nut and, as soon as the cylindric portion 28 of the nut enters the expanded sleeve, the expanded end portion of the sleeve then tightly hugs the cylindric portion of the nut. It is as if the sleeve had been tightly extruded around the nut. The rounded corner at 30 helps this action, assisting the smooth flow of the sleeve material around the nut. The action is such that the sleeve finally takes the cross-sectional configuration shown in Fig. 3, with an expanded head 10b tightly hugging the nut. The outer face 10c of the head assumes a curved configuration in the section of Fig. 3, indicating that the metal of the head, at least in its outer portions, has been drawn radially inwardly as a result of the longitudinally frictional drag of the nut on the inner surface of the expanded head in a direction toward the left in Fig. 3. As all of these facts indicate, the expanded head tightly grips the exterior face of the nut. The nut is consequently held against backing off not only by its serrated engagement along the conical face with the material of the sleeve, but also by the tight grip of the sleeve.

It is important that the final position of the nut shall be such that its axis closely coincides with the sleeve and screw axis, in spite of the facts that the nut initially fits the screw rather freely and that only the forward part of the nut is finally compressed tightly about the screw. The proportional nut length is one factor in assuring proper alinement of the nut. The nut compression is another, and the tight enclosure of the nut by the expanded head 10b is another factor. As a result, as shown by dissection of set rivets, the nut is set up very accurately in alinement, the form of the expanded head is accurately concentric and symmetric about the rivet axis, and the thickness of the sleeve material at the annular plane designated by the dimension S in Fig. 3 is accurately uniform. Tests have shown that the ultimate strength of the rivet depends largely on the facts just stated.

The screw is rotated and the nut is set up until the thickness dimension of the sleeve indicated at T, between sheet corner 30' and conical nut face 26, is approximately equal to the original thickness of the sleeve wall, or perhaps slightly less. If sheet corner 30' is sharp, it may bite into the outer surface of the sleeve somewhat by the time the nut is set up to desired tightness, and the dimention T may be then slightly less than the original sleeve wall thickness. On the other hand if sheet corner 30' is slightly rounded or countersunk, the dimension T with the nut fully set up will be approximately the original sleeve wall thickness, or even a little more due to the thickness expansion of the sleeve wall.

Longitudinal compression of the sleeve, and attendant thickness expansion, take place gradually as the nut is drawn home, until finally the sleeve tightly fills holes 16 and tightly grips the screw as the nut is forced home. And also, as the nut is finally drawn to set position, it is radially compressed to grip the screw. The final and complete longitudinal compression of the sleeve to grip the screw, and the final compression of the nut to grip the screw, both take place substantially simultaneously as the nut is finally drawn up against the conically expanded sleeve which has at that time come up against the inner face of the sheet. Screw-threads 15a do not extend to screw head 21. Preferably they only extend far enough on the shank of the screw to accommodate the nut when drawn home, as shown in Fig. 3. Thus a cylindric unthreaded screw surface 31 is left of considerable length to be gripped by the contracted inner surface of the sleeve. In its finally set condition all parts of the rivet are held tightly in place, and all of them held under stressed condition, with no likelihood of being loosened or released except by deliberate and forcible backing off of the screw and nut. The threads of the screw and nut are fine enough to be irreversible in action—longitudinal pressure on the nut does not tend to rotate the screw backwardly. The nut is held against rotation by its serrated engagement with the sleeve and also by the tight grip of the sleeve on it. The radially compressive action of the sleeve on the nut has put the nut, or at least its forward conical end, under radial compression and has tightly compressed the nut about the screw. That compressive action of the nut on the screw is one factor which holds the screw against rotation. The other factor of prevention of screw rotation is the gripping of the screw by the internally contracted sleeve.

Thus, as described, all of the parts are held tightly in their finally set condition, and all are held under stress. The sleeve is held stressed under its longitudinal compression, and therefore held under stress in its wall thickness expansion. Its relatively soft material, particularly if it be a material which remains soft and does not harden with aging, may flow to relieve those stresses somewhat. However, the screw is permanently held under its initial longitudinal stress, and the nut under compressive stress.

The ultimate strength of the set rivet depends not only upon the strength of the sleeve, but also upon the strength of the screw, and upon the shearing strength of the material of the sleeve in the plane which is indicated by the dimension S on Fig. 3. Repeated failure tests on rivets of the indicated dimensions and constructed of the specifically indicated materials show that the average transverse shearing strength (in the interplane of the sheets) is approximately 975 pounds, of which the shearing strength of the screw contributes about 64%. The ultimate average tensile strength of the set $\frac{3}{16}''$ rivet, set in flat sheets with sharp sheet corners as illustrated in Fig. 3, is 600 lbs. With the specifically described rivet, tensile failure invariably takes place by shearing the material of the sleeve across the dimension S rather than by tensile rupture of the sleeve and screw. And my investigations and tests seem to indicate that, if the sleeve wall were made slightly thicker, and screw 15 correspondingly slightly smaller, then tensile failure would take place by pulling the expanded head 10b through the sheets, if they are of the thickness usually used in aircraft and similar structures.

In case the sleeve be made somewhat thicker walled, the somewhat smaller screw may then be made of harder and stronger material, to maintain the transverse shearing strength, or even increase it. With any given sleeve wall thickness, increase in hardness and strength of the screw will increase the transverse shearing strength, but will not increase the ultimate tensile strength of the set rivet, unless the sleeve is harder or thicker, as long as the dimensions are such that tensile failure takes place by shearing across the dimension S. If ordinary soft materials are used in the sleeve, then its set hardness and strength are limited by the ductility which is necessary for the setting operation. In that case the sleeve might be made somewhat thicker walled, and the slightly smaller screw of harder and stronger material. Where a sleeve of initially ductile but ultimately hard and strong material is used, the ultimately set strengths of the rivet depend largely on the sleeve strengths ultimately attained. I prefer to use such material; and when I speak of the softness and ductility of the sleeve I refer to its characteristics at the time of rivet setting and not necessarily its ultimate characteristics.

Figs. 4 to 6 show my rivet applied to sheets which are countersunk by "dimpling." The rivet structure in these figures is the same as that shown in Figs. 1 to 3, except for the preformed heads. With those exceptions the same numerals are applied to Figs. 4 to 6 as are applied to Figs. 1 to 3. In Figs. 4 to 6 the preformed sleeve head 11d is shown as conical and with screw driver or spanner slots 14d. And the screw head 21d is shown also as conical, countersunk in sleeve head 11d; the whole head assembly forming a countersunk flush head in the countersunk holes of the sheets. The application of this form of rivet to ordinary machine-countersunk holes will be obvious. The sheets 13 and 13a here have their holes countersunk by the dimpled formations 40, so that the sheet edges 41 which surround the holes are presented at an angle to the axis which depends upon the dimpling or countersink angle. As used in current aircraft construction the countersink angle varies somewhat, but averages close to an included angle of 100°. Consequently the average included conical angle of sheet edges 41 is approximately 80°. That included angle falls within the limits which I have previously specified as the proper included angle for the conical face of the nut; and within those limits I have adopted the included angle of 80°.

The general setting up action of the rivet shown in Figs. 4 to 6 is the same as that shown in Figs. 1 to 3 and before described. In the finally set condition the thickness of the sleeve material at T, between the conical face of the nut and sheet edge 41 is approximately the same as, or even a little more than the original sleeve wall thickness, due to the fact that the faces 26 and 41 are substantially parallel and neither presents a corner which bites into the sleeve wall. The sleeve expands externally against the sheet corners which are indicated at 42 in Fig. 6, and also expands as shown at 43 between those sheet corners. The cylindric screw surface 31d is not quite as long as in the form of Figs. 1 to 3, due to the countersunk location of the screw head; but the cylindric surface is still of ample area to enable the internally contracted sleeve to effectively grip the screw.

Failure tests on the $\frac{3}{16}$" rivet of the specified materials applied to the dimpled sheets have uniformly resulted in tensile failure due to the pulling of sleeve head 10b through the sheets, at an average of 850 pounds in a pair of .064" sheets. The shearing dimension indicated at $S_d$ in Fig. 6 may be somewhat greater than the corresponding dimensions S in Fig. 3, due to the fact that the sharp corner 30' of Fig. 3 is not present to bite into the sleeve wall. The fact that failure in the dimpled sheets takes place by sheet failure indicates that the proportional dimensions which have been given for the soft sleeve make the sleeve very nearly thick enough to cause tensile failure in Fig. 3 by pulling through the sheets rather than shearing across the dimension S.

In brief summary, my blind rivet, capable of being easily and quickly applied by a one-man operation, has substantially all of the desirable characteristics of a rivet of any type. Like an ordinary rivet it holds the sheets or plates tightly compressed together, and it fills the holes solidly so as to form a rigid joint and one which fluid cannot enter at any place. It utilizes a solid (e. g. unslotted or unsplit) sleeve which retains its maximum strength and allows no fluid penetration. It obtains a good inside head, and has the full tensile and shearing strengths of all its parts. Its strengths are substantially those of a solid rivet; and its permanency is substantially that of a solid rivet. And it requires no special preparation, notching or other mutilation of the sheets.

I claim:

A rivet assembly comprising a tube having continuous unbroken walls and an outstanding circumferential flange at its outer end disposed at substantially right angles thereto, the tube being initially of an even diameter from its flange to its inner end and being of a length adapting it to pass through registering openings in articles to be secured together with the flange bearing against the outer face of one article and the inner end portion of the tube protruding from the other article, a bolt passing through said tube with its head bearing against said flange, said bolt being snugly received in the tube and having its threaded end portion protruding from the inner end of the tube, and an expander nut threaded upon the protruding threaded end portion of the bolt and having a substantially frusto-conical inner end portion, the nut when moved in a tightening direction by turning of the bolt being shifted along the bolt into position for engaging within the protruding inner end portion of the tube and expanding the protruding end portion of the tube to form a cup-shaped unbroken collar snugly receiving the nut and having its inner end portion formed with an outstanding concentric shoulder fitting snugly about the frusto-conical portion of the nut and cooperating with the flange to hold the articles tightly clamped against each other.

GEORGE W. COOK.